July 28, 1959 — R. ASHTON — 2,896,594
AIR INTAKE SYSTEM FOR HARVESTING MACHINES
Filed May 26, 1958 — 3 Sheets-Sheet 1

INVENTOR.
ROBERT ASHTON
BY
Carlson, Pitzner, Hubbard & Wolfe
ATTORNEYS.

July 28, 1959  R. ASHTON  2,896,594
AIR INTAKE SYSTEM FOR HARVESTING MACHINES
Filed May 26, 1958  3 Sheets-Sheet 2
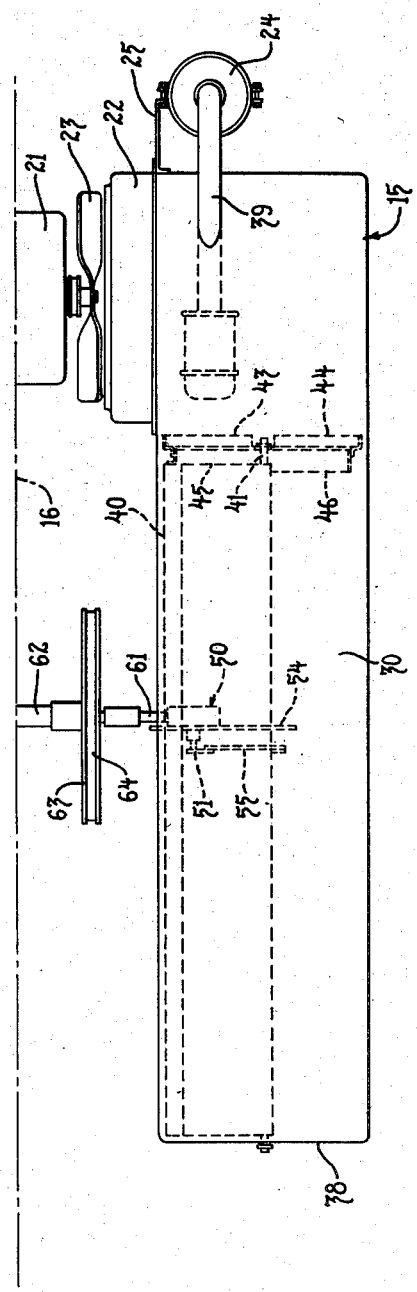
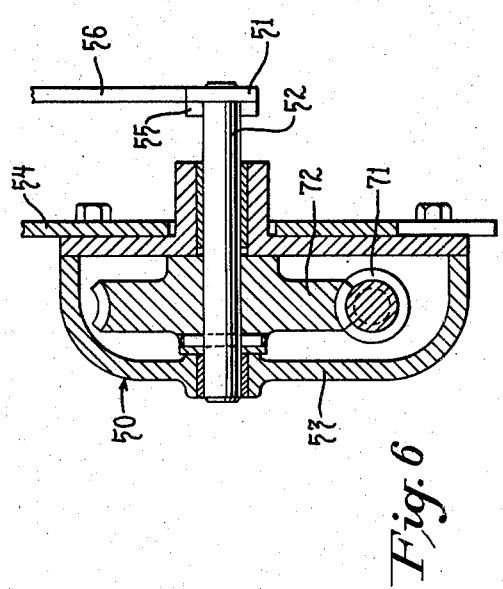
INVENTOR.
ROBERT ASHTON
ATTORNEYS.

July 28, 1959 R. ASHTON 2,896,594
AIR INTAKE SYSTEM FOR HARVESTING MACHINES
Filed May 26, 1958 3 Sheets-Sheet 3
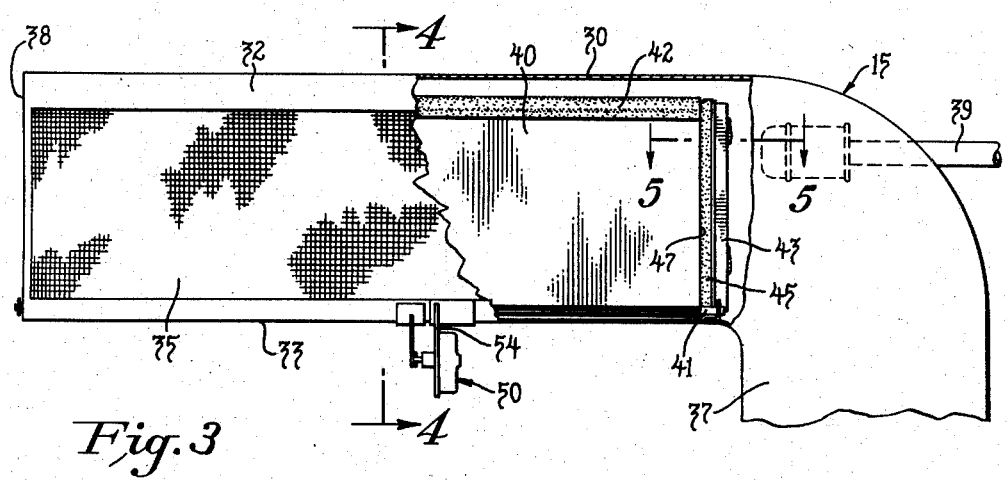
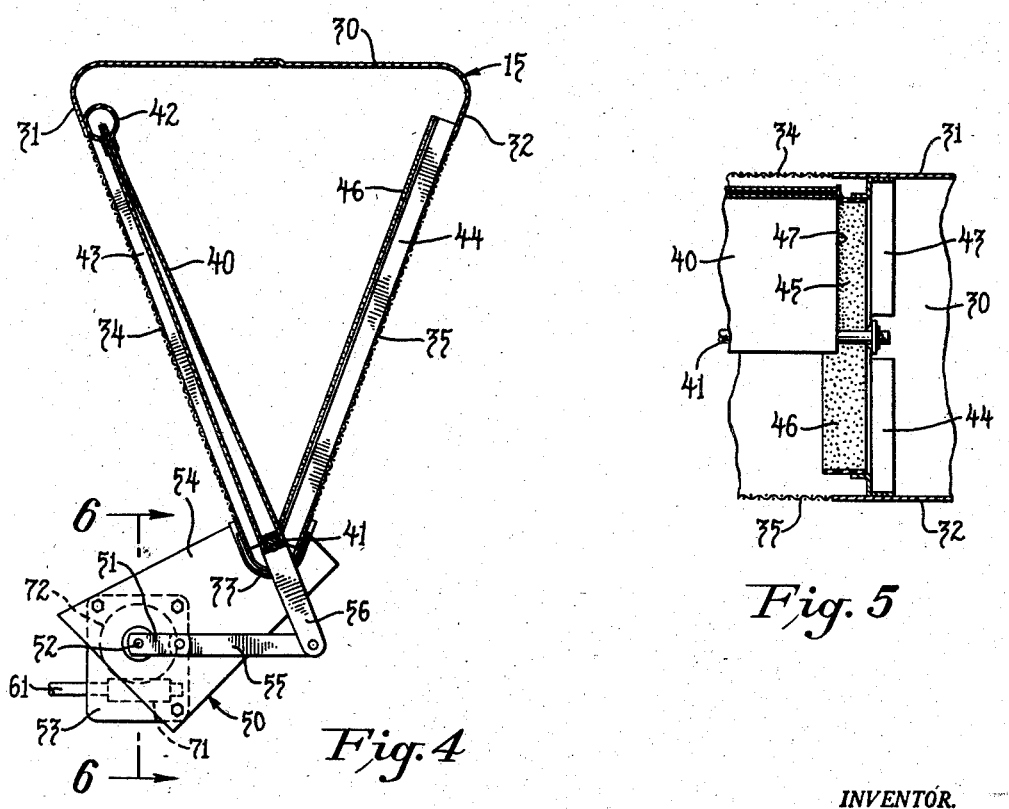
INVENTOR.
ROBERT ASHTON
BY
Carlson, Pitzner, Hubbard + Wolf
ATTORNEYS.

United States Patent Office 2,896,594
Patented July 28, 1959

2,896,594

AIR INTAKE SYSTEM FOR HARVESTING MACHINES

Robert Ashton, Toronto, Ontario, Canada, assignor to Massey-Ferguson Limited, a Canadian company Application May 26, 1958, Serial No. 737,556

4 Claims. (Cl. 123—41.04)

The present invention relates generally to agricultural harvesting machines and more particularly to an air intake system particularly suitable for supplying clean air to the internal combustion engines of such machines.

Agricultural equipment usually operates, of necessity, in dust and dirt laden air, and harvesting machines, or combines, are especially surrounded by flying dust, dirt, chaff and other debris when in operation. However, the internal combustion engines which power such machines require a constant supply of clean air. Securing this air supply by filtering out the harmful particles from the surrounding atmosphere is a difficult problem because of the volume of air required and the substantial amount of foreign material encountered.

Accordingly, it is the primary aim of the present invention to provide a novel air intake system having two, large-area, screened air intake openings compactly arranged through which air is alternately drawn into a wide air supplying chamber that is in communication with the air intake of a vehicle engine or the like.

It is a further object to provide such a novel arrangement in which the screened air intakes are positioned for facilitating the discharge or clearing of foreign material therefrom when air is not being drawn therethrough.

It is another object to provide an air intake system having the above characteristics that is exceptionally simple to construct and which is of a particularly rigid and sturdy design.

It is a more detailed object to provide an air intake system of the above type which employs an inexpensive arrangement for assuring positive cutoff of the air flow through the screen not in use so that there is no tendency for foreign material to be retained against this screen and it is completely cleared of foreign material while the other screen is in operation.

Other objects and advantages of the invention will become apparent upon considering the attached detailed description and upon reference to the drawings in which:

Fig. 2 is a plan view of the air intake system shown in Fig. 1;

Fig. 3 is a fragmentary elevation view partially in section of the air intake system shown in Fig. 1;

Fig. 4 is a transverse sectional view taken along the line 4—4 of Fig. 3;

Fig. 5 is a fragmentary sectional view taken along the line 5—5 of Fig. 3; and

Fig. 6 is a fragmentary sectional view taken along the line 6—6 of Fig. 4.

Figure 1:
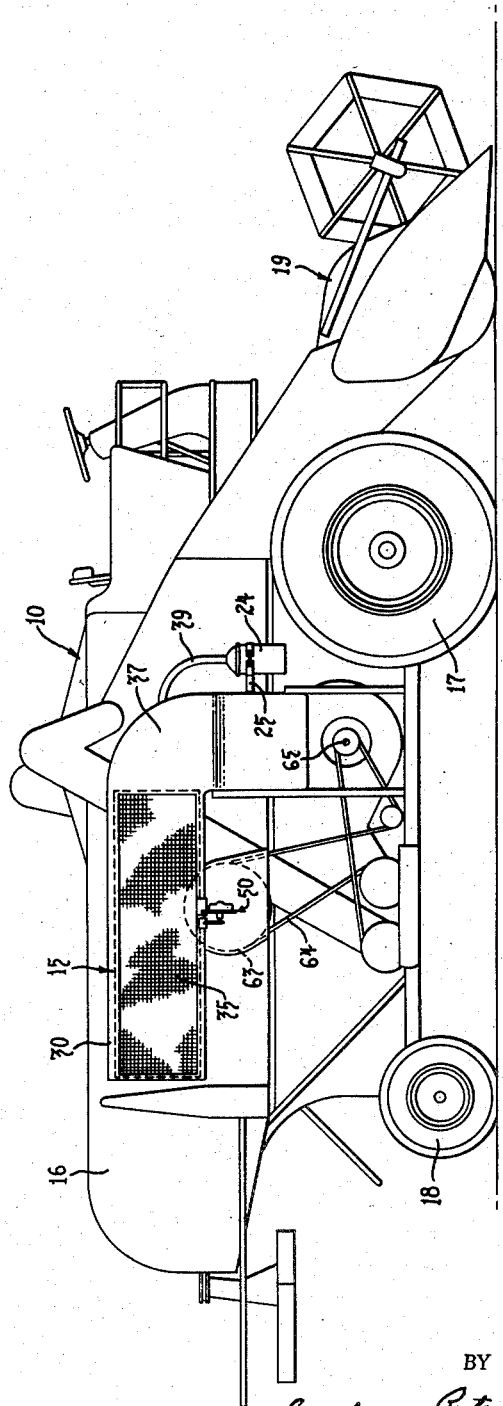
Figure 1 is an elevation view of a harvesting machine, or combine, on which the air intake system of the present invention has been installed.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to Fig. 1, there is shown a harvesting machine or combine 10 on which an air intake system 15 constructed in accordance with the present invention has been installed. The combine 10 is a typical self-propelled unit of its type, and includes a main body 16 supported on front traction wheels 17 and rear steering wheels 18. At the forward end of the body 16 there is mounted a harvesting table assembly 19.

Power for operating the combine 10 is obtained from an internal combustion engine 21 (see Fig. 2) which is carried by the main frame of the combine body 16. Associated with the engine 21 is a radiator 22, and a fan 23, driven by the engine, is arranged to draw air through the radiator. To provide air for engine combustion, an air cleaner 24 is attached by a bracket 25 to the radiator 22 and is connected to the engine carburetor (not shown) in the usual manner.

In accordance with the present invention, the air intake system 15 includes an elongated air supply chamber in communication with both the radiator 22 and the air cleaner 24 and having opposed screened air intake openings, sloping reversely so as to define a pointed cross section with the point aimed downwardly, which are alternately closed so that the screens are regularly self-cleaning. In the preferred embodiment, a chamber 30 having a triangular cross section is secured alongside of the combine body 16. Giving the chamber 30 its triangular cross section are a pair of reversely sloping opposite sides 31, 32 which join along a lower line 33 that defines the point of the chamber cross section that is aimed downwardly (see Fig. 3).

In the reversely sloping sides 31, 32 there is provided screened air intake openings 34 and 35 respectively. It will be noted that the screened openings 34, 35 extend over substantially the full area of the opposite chamber sides 31, 32 and thus provide exceptionally large-area intake openings.

In order to couple the chamber 30 with the air intake side of the radiator 22, a suitably curved duct 37 is provided which extends from the forward end of the chamber 30 to the outer air intake side of the radiator (see Fig. 2). A triangular plate 38 is provided to close the rear end of the chamber 30.

So that the air cleaner 24 may draw filtered air from within the chamber 30, an air conduit 39 is extended from the air intake opening of the air cleaner 24 up into the upper portion of the duct 37. Air utilized by the carburetor of the internal combustion engine 21 is therefore drawn through the screened air intake openings 34, 35 before passing into the air cleaner 24. In this way, premature clogging of the air cleaner is avoided.

In order to alternately close the air intake openings 33, 34, a shutter 40 is pivoted within the chamber 30 on an axis 41 which permits the shutter to swing from a first position where it closes the air intake opening 34 to a second position where the air intake opening 35 is closed. So as to insure a positive seal between the shutter 40 and the surrounding edges of the respective air intake openings when the shutter is swung against the openings, flexible members are supported within the chamber 30 so as to seal the top and sides of the shutter about the edges of the openings when the shutter is swung thereagainst. In the illustrated embodiment, one of the flexible members takes the form of a resilient tube 42 secured along the top of the shutter 40 so as to be pressed into sealing contact with either the side 31 or the side 32 of the chamber 30 when the shutter 40 is moved against the openings 34, 35 respectively. For maintaining a seal along one of the sides of the shutter 40, a pair of brackets 43, 44 having L-shaped cross sections are secured to the inner surfaces of the chamber sides 31, 32 respectively. The brackets 43, 44 support strips of resilient material 45, 46 respectively which sealingly engage the side edge 47 of the shutter 40 when the latter is swung against the screened air intake openings (see Fig. 5). Although only the sealing elements for establishing a seal between the respective chamber sides 31, 32 and the edge 47 of the shutter 40 have been shown in the drawings and described herein, it will be understood that brackets and sealing strips identical to those appearing in Fig. 5 may also be provided for the opposite side edge of the shutter.

For the purpose of swinging the shutter 40 between its first and second positions, a crank assembly 50 is provided. The crank assembly 50 includes a crank arm 51 mounted on a shaft 52 which is journaled in a housing 53. The housing 53 is mounted on a bracket plate 54 carried by the housing structure 15.

Interconnecting the crank arm 51 and the shutter 40, is a link 55 which couples the crank arm to an arm 56 that is rigidly secured to the shutter 40 and depends downwardly through an aperture in the lower portion of the chamber 30. It will therefore be observed that rotation of the shaft 52 will cause swinging movement of the shutter 40 between its two screen closing positions.

To constantly rotate the shaft 52 when the combine is in operation, an extension shaft 61 is secured to the front straw walker shaft 62 of the combine (see Fig. 2). The front straw walker shaft 62 is rotated by a pulley 63 secured thereto that is driven by a belt 64 powered by the fanning mill shaft 65. The fanning mill shaft is driven by the engine 21 in the manner conventional with machines of this type.

So as to swing the shutter 40 at a desirably slow rate of speed, a worm 71 is journaled in the housing 53 and coupled to the shaft extension 61. In meshing engagement with the worm 71 is a worm gear 72 that is keyed or otherwise secured to the shaft 52. It will therefore be seen that rotation of the front straw walker shaft 62 will be accompanied by a significantly slower rotation of the shaft 52. As observed above, rotation of the shaft 52 causes oscillation of the shutter 40 so as to alternately close the two air intake openings 34, 35.

Because of the reversely sloping disposition of the screened air intake openings 34, 35, it can be seen that foreign material held against these screens when air is being drawn therethrough will fall directly downward when the airflow therethrough is cut off and there is no further force holding the material against the screens. Thus, each of the screened air intake openings 34, 35 are quickly self-cleaning as the shutter 40 swings back and forth to alternately cut off the air intake.

It will also be observed that because of the triangular configuration of the chamber 30, a particularly rigid construction is economically achieved. Moreover, it can be seen that the entire volume of the chamber 30 is always available to supply filtered air to the elements of the combine 10 requiring clean air. That is, when the shutter 40 is swung against the screened opening 34, the full chamber 30 is available to carry air from the screened air intake opening 35 to the radiator 22 and the air cleaner 24. When the air intake opening 35 is closed, the entire chamber is again available to carry air admitted through the air intake opening 34. Because the full volume of the chamber is always available and because of the large area of the screened air intake openings 34, 35, the air intake system 15 is effective to supply large volumes of filtered air.

I claim as my invention:

1. An air intake system for a harvesting machine having a fan for drawing air through a compartment, comprising, in combination, an elongated chamber defining a substantially unobstructed air conduit and being supported on the side of the machine, a duct connecting said chamber and said compartment, a pair of screened air intake openings extending substantially the full length of said chamber and opening into the conduit defined thereby, and an elongated shutter pivoted within said chamber on an axis permitting the shutter to swing from closing one air intake opening to closing the other air intake opening, and means for swinging said shutter so as to alternately cut off the air intake through said openings and thus allow foreign material held against the screens by the airflow therethrough to fall free when the airflow is interrupted.

2. An air intake system for a harvesting machine having a fan for drawing air through a compartment, comprising, in combination, an elongated chamber having opposite sides sloping reversely to define a pointed cross section, said chamber being supported on the machine with said cross sectional point aimed downwardly, a duct connecting said chamber and said compartment, a screened air intake opening located in each said chamber side, and an elongated shutter pivoted within said chamber on an axis permitting the shutter to swing from closing one air intake opening to closing the other air intake opening, and means for swinging said shutter so as to alternately cut off the air intake through said openings and thus allow foreign material held against the screens by the airflow therethrough to fall free when the airflow is interrupted.

3. An air intake system for a harvesting machine having a fan for drawing air through a compartment, comprising, in combination, an elongated chamber having opposite sides sloping reversely to define a pointed cross section, said chamber being mounted on the machine with said cross sectional point aimed downwardly, a duct connecting said chamber and said compartment, a screened air intake opening located in each of said chamber sides, an elongated shutter pivoted within said chamber on an axis permitting the shutter to swing against first one and then the other of said air intake openings, flexible members supported within said chamber so as to seal the top and sides of said shutter about the edges of said openings when the shutter is swung thereagainst, and a crank drive from said machine coupled to said shutter for swinging said shutter alternately against said openings so as to alternately cut off the air intake through said openings and thus allow foreign material held against the screens by the airflow therethrough to fall free when the airflow is interrupted.

4. An air intake system for a harvesting machine having an internal combustion engine with a fan for drawing air through an engine radiator, comprising, in combination, an elongated chamber having opposite sides sloping reversely to define a pointed cross section, said chamber being supported on the machine with said cross sectional point aimed downwardly, a duct connecting said chamber and the air intake side of said radiator, an air conduit for supplying combustion air to said engine and having its intake port in communication with said chamber, a screened air intake opening located in each of said chamber sides, an elongated shutter pivoted within said chamber on an axis permitting the shutter to swing from closing one air intake opening to closing the other air intake opening, and means for swinging said shutter so as to alternately cut off the air intake through said openings and thus allow foreign material held against the screens by the airflow therethrough to fall free when the airflow is interrupted.

References Cited in the file of this patent
UNITED STATES PATENTS 2,455,734    Clausen    Dec. 7, 1948
2,783,856    Krause    Mar. 5, 1957